2,399,255

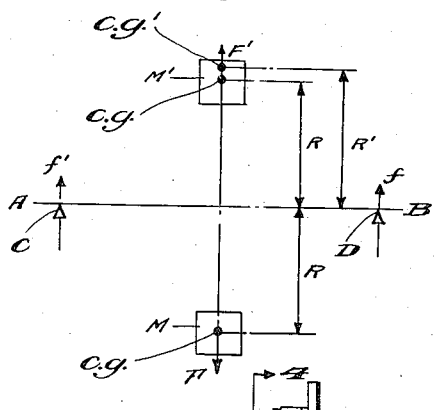
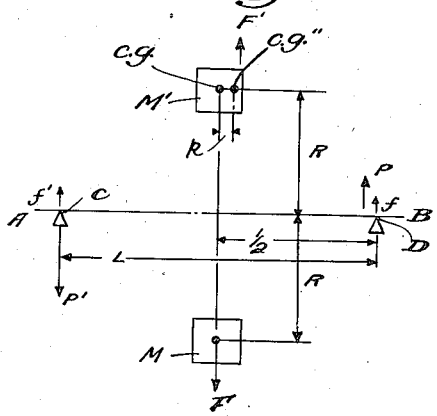
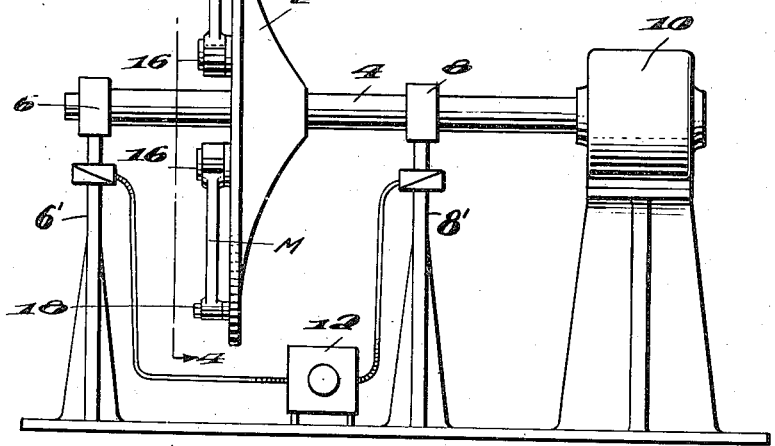
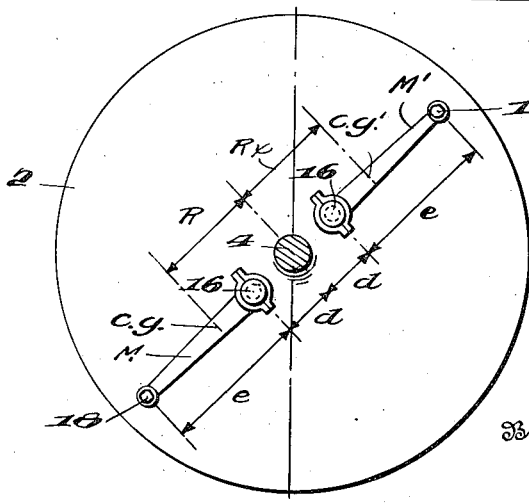
Inventor
AUGUSTE LOUIS MARIE ANTOINE ROUY

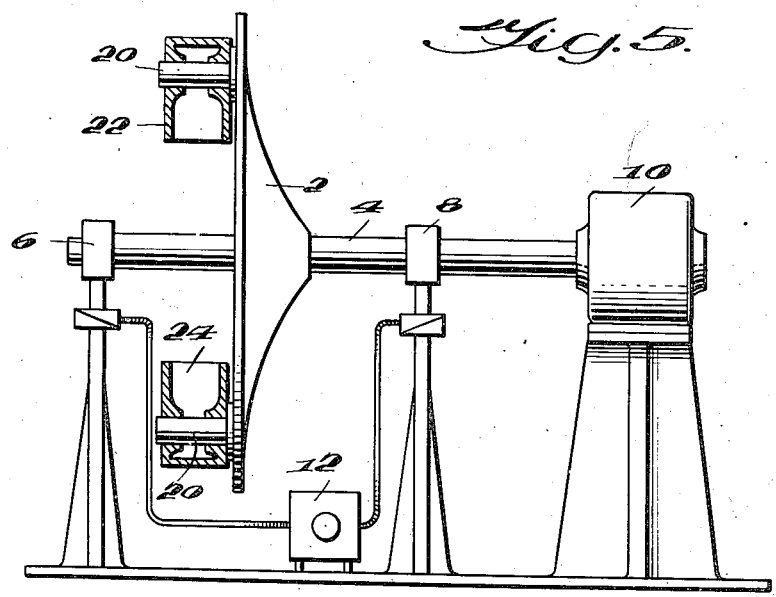
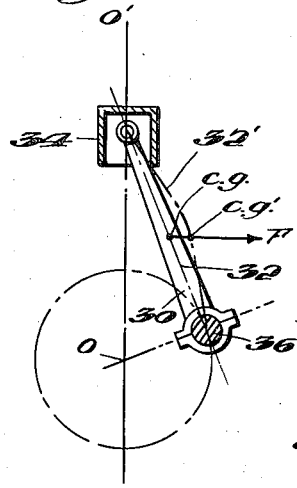 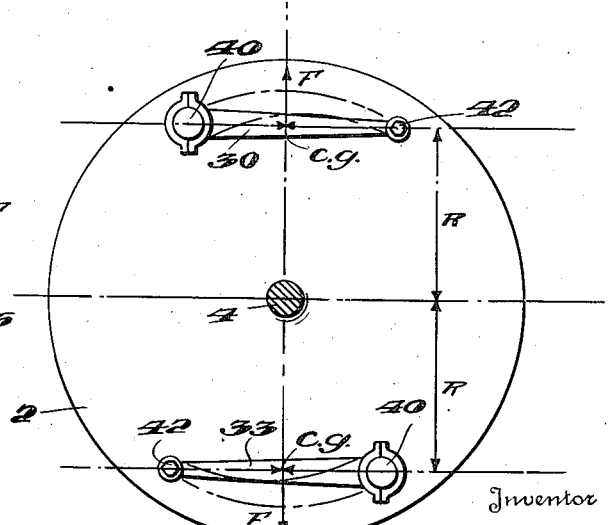
Inventor
AUGUSTE LOUIS MARIE ANTOINE ROUY,
By Bailey, Stephens & Huettig
Attorney Patented Apr. 30, 1946

UNITED STATES PATENT OFFICE 2,399,255

METHOD AND APPARATUS FOR BALANCING

Auguste Louis Marie Antoine Rouy, New York, N. Y., assignor to The Gyro-Balance Company, Greenwich, Conn., a corporation of Delaware Application August 29, 1941, Serial No. 408,904

7 Claims. (Cl. 73—66)

This invention is directed to a method and apparatus for balancing machine parts. More particularly, the invention relates to the balancing of moving machine parts.

In modern high speed engines, the vibrations produced by unbalanced parts moving at high speeds necessitates a very careful balancing of the parts. This is especially true for the balancing of pistons with respect to each other, and similarly true of connecting rods. Ordinarily these parts are merely statically weighed, and parts of equal weights used together. Such is not a complete solution of the balancing problem inasmuch as in rotating or reciprocating parts the position of the center of gravity in the part determines the maximum value of the inertia force. Heretofore the art has failed to measure in moving machine parts of apparent similar shape and weight, differences in their centers of gravity, and such has led to failures because of vibrations produced by the unbalanced parts.

An object of this invention is to balance reciprocating and/or rotating machine parts of similar size and shape, with respect to each other.

Another object of this invention is to measure the differences in position of the centers of gravity of moving machine parts of apparent similar shape and weight.

Another object of the invention is to make possible the selection of machine parts similar in shape, weight and position of the center of gravity.

Another object of the invention is to compare movable machine parts by balancing them with respect to one another.

Another object of the invention is to balance similar moving machine parts capable of individually flexing, and flexing with respect to each other.

Another object of the invention is to produce a method and apparatus for accurately determining the center of gravity of any mass.

Another object of the invention is to produce an apparatus for balancing movable machine parts.

Another object of the invention is to construct an apparatus for determining the differences in the location of the centers of gravity of moving machine parts of otherwise similar shapes and weights.

Another object of the invention is to produce a method of increasing the sensitivity and accuracy of a machine for balancing substantially similar elements.

Generally these and other objects of the invention are obtained by rotating upon a disc the parts to be measured, the centrifugal forces produced thereby enabling the positions of the centers of gravity to be determined. The centrifugal forces are measured from the forces of unbalance occurring in the bearings supporting the shaft upon which the disc is mounted. The accuracy of the apparatus is kept within allowable limits by making the length of the shaft greater than twice the radius of rotation of the part mounted on the disc for testing. Increased sensitivity of the apparatus is obtained by making the shaft relatively flexible.

The means by which the objects of the invention are obtained are more fully described with reference to the accompanying drawings in which:

Fig. 1 is a diagram illustrating the forces produced in the bearings of a shaft by unbalanced masses having radially differing centers of gravity;

Fig. 2 is a diagram illustrating the forces produced in the bearings of a shaft by masses having axially displaced centers of gravity;

Fig. 3 is a side elevational view of a balancing machine constructed according to this invention;

Fig. 4 is a cross-sectional view on the line 4—4, Fig. 3;

Fig. 5 is a view similar to Fig. 3 but illustrating the testing of a different element in the apparatus;

Fig. 6 is a diagram illustrating the flexure occurring in a connecting rod; and

Fig. 7 is a view similar to Fig. 4 but showing a modified form of the device for supporting the connecting rods mounted for testing upon the apparatus.

It has heretofore been assumed that rotating and reciprocating machine parts are adequately balanced by being of equal weight. No recognition has been made of the fact that small differences in the location of the centers of gravity in otherwise similar parts will create large forces of unbalance, especially at such speeds as are experienced in modern machines. For example, in Fig. 1, the masses M and M' are assumed of similar shape and weight and are rotated about an axis AB on fixed bearings C and D in a direction perpendicular to the plane of the paper. If the centers of gravity (c. g.) of each mass lie at a distance R from the axis AB, then their centrifugal forces are equal or $$F = M\omega^2 R = M'\omega^2 R$$

However, if the center of gravity of mass M' is actually located at c. g.' with a radius R', the two masses are no longer balanced, the difference in the forces being $$F''=F'-F=M\omega^2(R'-R)$$

Assuming M=2,000 grams, R=20 cm.

$$R'-R=1 \text{ mm}$$

and ω=3,000 R. P. M., the force F'', amounts to approximately 20 kilograms, and such a periodic force acting on the axis is sufficient to produce vibrations of great amplitude. Even if R'—R were only a tenth of a millimeter the difference in centrifugal forces would still be about two kilograms and sufficient to cause vibration of a shaft represented by axis AB.

This difference in force produces in the bearings C and D of a shaft having the axis AB the reactions $f$ and $f'$. Where the center of rotation of masses M and M' is at the midpoint of the shaft:

$$f=f'=\frac{M\omega^2(R'-R)}{2}$$

The forces $f$ and $f'$ can be measured by known methods, referred to hereinafter, and as the weight of the masses, the angular speed, and R are known, the radius R' can be determined.

Let it be assumed that the center of gravity of one of the masses is offset a distance $k$, equal to the radial displacement R'—R of Fig. 1, in the direction of the axis AB, as at c. g.", Fig. 2, instead of being radially offset as in Fig. 1. In this case as the radius of rotation R of masses M and M' is unchanged the centrifugal forces remain equal. However, they form a couple whose moment is:

$$Mo=Fk$$

This couple produces reactions P and P' at the bearings C and D, these forces being of equal strength but acting in opposite directions.

Hence:

$$P=P'=\frac{Fk}{L}=\frac{M\omega^2 Rk}{L}$$

where L is the length of the shaft between bearings C and D.

As $k=R'-R$, and as $$f=f'=\frac{M\omega^2 k}{2}$$

it follows that $$\frac{f}{P}=\frac{f'}{P'}=\frac{L}{2R}$$

From this relation it is seen that when L>2R, the forces in the bearings C and D are greater for a radial difference between the centers of gravity, as in Fig. 1, than for an equal difference in the direction of the shaft axis as in Fig. 2. For example, if L=100 cm. and R=10 cm.

$$\frac{f}{P}=\frac{L}{2R}=5$$

In other words, the reactions caused by a radial change in position of the center of gravity are five times greater in this example than the reactions which would be produced by an axial change of position of the same extent. For immediate consideration this relation means that because of the close manufacturing tolerances in manufacture of machine parts, axial displacements of the center of gravity can be for the most part ignored as long as L>2R and the axial distance $k$ is within the allowable tolerance. The relation also has another significance which will be later described.

An apparatus for effecting the balancing operations is shown in Figs. 3 to 5. In Fig. 3, a disc 2 is fixed upon a shaft 4 journaled in bearings 6 and 8 on the rigid pedestals 6' and 8', which correspond to bearings C and D of Figs. 1 and 2. A motor 10 is joined to shaft 4 for rotating the same. The forces produced in bearings 6 and 8 by rotation of shaft 4 can be measured by any known method. A measuring apparatus 12 is diagrammatically illustrated to represent that disclosed in my co-pending application for U. S. patent, S. N. 266,714, filed April 7, 1939, for "Measuring or detecting periodic forces," which has matured into Patent No. 2,329,654, granted September 14, 1943.

If for example, note Fig. 4, two connecting rods are to be balanced, one of which may be the standard against which the other is to be balanced, pins 16, diametrically aligned are set in the face of disc 2 at a distance $d$ from the center of shaft 4. Two more pins 18 are similarly positioned at a distance $e$ from pins 16, this latter distance being equal to the distance between the centers of the journals on each end of a connecting rod. The apparatus itself is then carefully balanced.

The connecting rods are then placed on the pins, and the rods correspond to the masses M and M' of Figs. 1 and 2. As the rods are presumed of equal shape and weight, rotation of the disc will immediately produce forces of unbalance in the bearings 6 and 8 if there is any difference in the positions of the centers of gravity. If rod M is a standard having a known center of gravity at a distance R from the axis of shaft 4, then the radius $Rx$ for the center of gravity of rod M' can be readily determined.

Likewise the difference both in weight and in position in center of gravity of rod M' can be ascertained, and corrected by adding or subtracting weights by well known methods. As the centrifugal force is proportional to the square of the speed of rotation of the disc, an increase in the speed of rotation creates greater forces in the bearing and thus permits an accurate determination of very small differences between the rods.

It is known that the maximum value of the inertia force of a reciprocating part having a stroke S is the same as that of an equivalent mass rotating with a radius R, where R is equal to one half the stroke S, and that the maximum force is reached at the end of the stroke. Hence pistons as well as connecting rods, and other reciprocating parts of an engine can be balanced by measuring their centrifugal forces when rotated about a shaft.

In Fig. 5 the apparatus is used for the balancing of pistons. Disc 2 is fitted with pins 20 diametrically opposed and equidistant from the center of rotation. These pins may correspond to wrist pins, and upon them pistons 22 and 24 are placed. Piston 22 may be a standard against which piston 24 is measured. As described for Figs. 3 and 4, the pistons of Fig. 5 are rotated with disc 2, and differences in their weights and centers of gravity determined.

Although connecting rods are reciprocating parts and may have their maximum inertia force measured by rotation in the apparatus of Figs. 3 and 4, the problem of balancing connecting rods is complicated by reason of the flexure in the rods, as illustrated in Fig. 6. Connecting rod 30 having a longitudinal axis 32 is diagrammatically shown joining piston 34 and crank 36 of a crankshaft having axis 0.

As piston 34 reciprocates, rod 30 is displaced alternately from left to right of the axis of reciprocation 00', and causes the mass of the rod at its center of gravity to exert an inertia force F. This force tends to bend the rod 30 as indicated by the bowed displaced axis 32', and the center of gravity is displaced to c. g.'. It is clear that the final magnitude of force F depends upon the transverse bending of rod 30, and that this force should be the same for all the connecting rods in any given motor.

To determine the flexure differential between two connecting rods, one of which may be a master or standard rod, the apparatus of Fig. 7 is used. Upon disc 2, pairs of pins 40 and 42 are placed in parallel lines equidistant from the center of the disc. These lines are perpendicular to a diameter of the circle, and the pins in each pair of pins are located on opposite sides of this diameter in such a way as to position the approximate centers of gravity of the rods to be held by the pins on the diameter.

Rod 30 is placed upon one pair of pins 40 and 42, while a comparing rod 33 is placed upon the other pair of pins. The disc is then rotated and the centrifugal forces F tend to flex the rods. As long as the flexure of the rods is equal, with an equal elongation of the radii R, no vibration will occur, but if one rod flexes more than the other, the increased centrifugal force caused by the increase in the radius to the center of gravity, immediately causes measurable forces of unbalance in the bearings 6 and 8. The flexibility of the rods can then be adjusted to bring them into balance.

As previously pointed out, the responsiveness of the apparatus can be increased by increasing the speed of rotation of disc 2. There are two more ways in which the responsiveness, sensitivity and accuracy of the machine can be improved.

First, it has been shown with reference to Fig. 2, that $$\frac{f'}{P'}=\frac{f}{P}=\frac{L}{2R}$$

and that when L>2R the forces produced upon the bearings are correspondingly greater for radial displacements of the center of gravity as compared to equal axial displacements of the center of gravity. Hence, in the apparatus of Fig. 3, the length of shaft 4 between bearings 6 and 8 is made greater than twice the radius R between the center of the disc and the approximate center of gravity of one of the rods mounted on the disc. The apparatus thereby avoids errors which may be caused by slight axial differences in the positions of the centers of gravity of the masses being balanced.

Secondly, the centrifugal force created by unbalance in a disc mounted upon a rotating shaft, bends the shaft so that the entire shaft is deflected and the axis of the shaft falls outside of the theoretical axis of rotation. If the rigidity of a shaft is lessened, the deflection is increased. Thus, by reducing the stiffness of shaft 4 between bearings 6 and 8, the centrifugal force produced by the masses being balanced can be increased many times, and the accuracy of the balancing is accordingly proportionately increased.

The amount of amplified force produced in this manner is:

$$F=m\omega^2 R\left[1+\frac{\omega^2(M+m)}{K-\omega^2(M+m)}\right]$$

wherein $m$ is the mass of unbalance, M is the mass of the entire rotor with no unbalance present including shaft, disc and the machine parts on the disc, K is the transverse rigidity of the shaft, $\omega$ is the angular velocity, and R the distance between the axis of the shaft and the center of gravity of the mass of unbalance $m$.

For practical solutions of this equation $m$ can be disregarded as it is very small relative to M. Hence $$F \text{ approx}=\omega^2 R\left[1+\frac{M\omega^2}{K-\omega^2 M}\right]$$

Since the centrifugal force due solely to the unbalance in a rigid shaft is:

$$F'=m\omega^2 R$$

it follows that this force is amplified in the ratio:

$$\frac{F}{F'}=1+\frac{\omega^2(M+m)}{K-\omega^2(M+m)}$$

By reducing the rigidity K of the shaft, the last term on the right hand side of the above equation can be made as large as desired, thus demonstrating that a decrease in the rigidity of the shaft may be used to increase the centrifugal forces produced in the machine parts being balanced with a resultant increase in accuracy of measurement.

The ratio can also be increased by increasing the mass M of the rotor, and also by increasing the angular velocity $\omega$. When $K=\omega^2(M+m)$ the amplification becomes infinite.

It has been thus shown that machine parts adapted to rotate, to reciprocate, or both can be balanced. Parts subject to bending can be balanced for flexure. By correctly balancing these parts, heretofore experienced vibrations can be eliminated, and in some instances the weight of parts can be reduced, an advantage especially desired in the construction of aircraft engines.

The apparatus for balancing the parts is simple in structure and operation, and either by proportioning the length of the supporting shaft relative to the radius of rotation of the test parts, or by increasing the flexibility of the shaft, or both, is made exceedingly responsive, sensitive and accurate.

Having now described a means by which the objects of the invention are obtained, I claim:

1. A method of testing an elongated machine part for flexure which includes revolving the test part and a standard part of similar configuration and weight and of a known rigidity, about an axis passing midway between the said parts, the longitudinal axes of said parts each being substantially perpendicular to the same line passing through the axis of rotation, and determining the flexure of said test part by the displacement of its center of gravity as indicated by the difference in centrifugal forces set up during said rotation.

2. A balancing apparatus for accurately comparing properties of elements of substantially the same configuration and weight, said apparatus comprising a horizontally disposed rotatable shaft, a pair of spaced bearings supporting said shaft, means for rotating said shaft, a disc rigid with said shaft disposed between said bearings and lying in a plane at right angles with the axis of said shaft, said disc and shaft being free from unbalance, and means on said disc for holding a balanced master element and a test element symmetrically upon diametrically opposite sides of the axis of the disc with their longitudinal axes in a plane perpendicular to the axis of the shaft, 3. A balancing apparatus for accurately comparing properties of elongated elements of substantially the same configuration and weight, said apparatus comprising a horizontally disposed rotatable shaft, a pair of spaced bearings supporting said shaft, means for rotating said shaft, a disc rigid with said shaft disposed between said bearings and lying in a plane at right angles with the axis of said shaft, said disc and shaft being free from unbalance, and means on said disc for holding a balanced master element and a test element symmetrically upon diametrically opposite sides of the axis of the disc at two spaced points non-coincident with the centers of gravity of said elements, the lengths of said pieces each being perpendicular to the same diameter of the disc and in a plane perpendicular to the axis of the shaft, said diameter passing substantially through the centers of gravity of said elements.

4. An apparatus for comparing elongated members for transverse flexure, said apparatus comprising means free from unbalance for revolving said members about an axis passing between said members, the members each being supported by said means at a pair of points spaced along the length of the piece and each point spaced from the center of gravity of said piece, the lengths of the elongated members being perpendicular to the same straight line passing through the axis and substantially equidistant from said axis and in a plane perpendicular to the axis.

5. The method of balancing a movable machine part which comprises revolving the test part and a standard master part of the same size, configuration, and weight, about an axis midway between the parts with the longitudinal axes of the parts in a plane perpendicular to the said axis, and determining any differences in centrifugal forces developed by the parts due to relative displacement of their centers of gravity.

6. A balancing apparatus for accurately comparing properties of elements of substantially the same configuration and weight, said apparatus comprising a horizontally disposed rotatable shaft, a pair of spaced bearings supporting said shaft, means for rotating said shaft, a disc rigid with said shaft disposed between said bearings and lying in a plane at right angles with the axis of said shaft, said disc and shaft being free from unbalance, and means on said disc for holding a balanced master element and a test element symmetrically upon diametrically opposite sides of the axis of the disc, and means to measure the forces exerted on said bearings by the unbalance between said elements during rotation of the shaft.

7. In an apparatus as claimed in claim 6, said means holding said elements with their longitudinal axes in a plane perpendicular to the axis of the shaft.

AUGUSTE LOUIS MARIE ANTOINE ROUY.